(12) United States Patent
Kopylov et al.

(10) Patent No.: US 6,235,072 B1
(45) Date of Patent: May 22, 2001

(54) GLOVE BOX FILTER SYSTEM

(75) Inventors: Nonna Kopylov, Scotch Plains; Ahmet Refik Kortan, Warren, both of NJ (US)

(73) Assignee: Agere Systems, Inc., Miami Lakes, FL (US)

( * ) Notice: Subject to any disclaimer, the term of this patent is extended or adjusted under 35 U.S.C. 154(b) by 0 days.

(21) Appl. No.: 09/382,611

(22) Filed: Aug. 25, 1999

(51) Int. Cl.$^7$ .................................................. B01D 46/00
(52) U.S. Cl. ............................ 55/338; 55/385.2; 55/481; 55/DIG. 18
(58) Field of Search .................................. 55/385.2, 312, 55/340, 338, DIG. 18, 481; 454/187, 56

(56) References Cited

U.S. PATENT DOCUMENTS

| | | | |
|---|---|---|---|
| 4,249,463 | * 2/1981 | Hornby ........................ | 55/DIG. 18 |
| 4,704,951 | * 11/1987 | Pruchon ........................ | 55/385.2 |
| 4,927,438 | * 5/1990 | Mears et al. ..................... | 55/385.2 |
| 5,316,560 | * 5/1994 | Krone-Schmidt et al. ......... | 55/385.2 |
| 5,522,767 | * 6/1996 | Bertsche et al. .................. | 454/187 |
| 5,711,705 | * 1/1998 | Krainak et al. .................. | 55/385.2 |
| 5,730,765 | * 3/1998 | Henry et al. .................... | 55/385.2 |
| 5,730,777 | * 3/1998 | Petersen et al. ................. | 55/385.2 |
| 5,997,399 | * 12/1999 | Szatmary ....................... | 454/187 |

* cited by examiner

Primary Examiner—Duane S. Smith

(57) ABSTRACT

A glove box filter system for filtering out particles from a glove box environment defined in a glove box having an outlet and an inlet. The filter system includes a first filter stage for receiving removed gas from the glove box environment. The first filter stage contains a chamber having a first filter through which the removed gas passes for filtering out particles contained in the removed gas. The filtered gas is provided to a circulation conduit connected to a blower for providing movement of the gas through the glove box environment. A second filter stage connected to the glove box inlet is provided for fine-filtering the gas passed by the first filter stage prior to the return of the gas to the glove box environment. The first filter stage is connected to the glove box environment through one or more valves which isolate the first filter stage from the glove box environment when replacement of a first filter contained in the first filter stage occurs. A purging conduit is also provided for purging the first filter stage chamber of particles during replacement of the first filter.

7 Claims, 1 Drawing Sheet

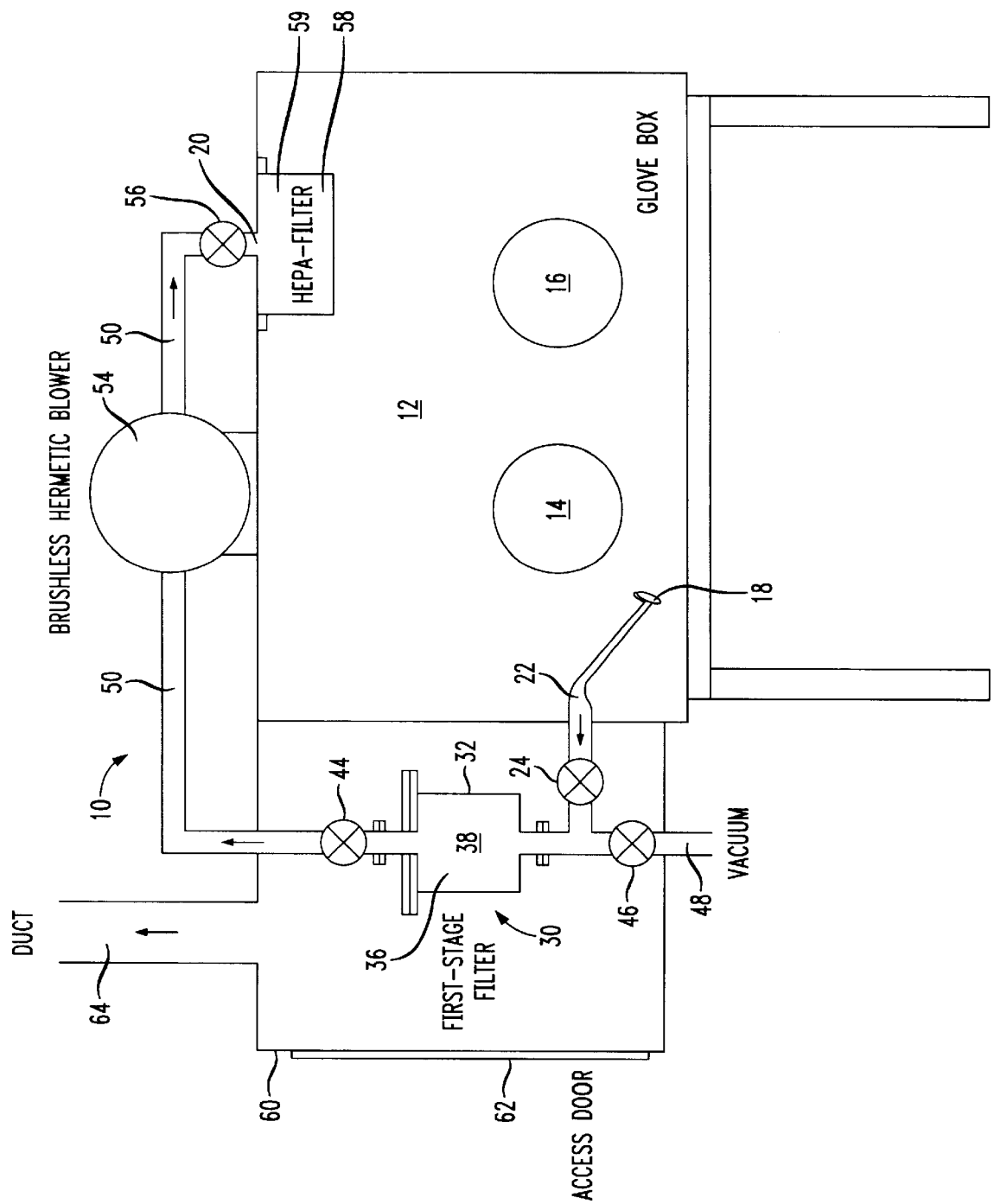

GLOVE BOX FILTER SYSTEM

BACKGROUND OF THE INVENTION

1. Field of the Invention

The present invention relates to a filter system for use with a glove box. More particularly, the present invention pertains to a glove box filter system for removing contaminants from an environment contained in a glove box.

2. Description of the Related Art

In the development of new materials used for photonics and electronics applications, the level of impurity contamination must be kept at extremely low levels, e.g. at levels below a few parts per billion. This imposes stringent requirements on particulate control in the rooms and chambers used in preparing infrared waveguide glass materials such as fluoride, telluride and chalcogenide glasses, materials which are prepared in bulk batch processes in controlled atmosphere glove boxes. The removal of all particulates from the work area, i.e. from a glove box chamber, is essential for the efficient manufacturing of high quality optical materials. Glass processing is an intrinsically particle generating process because, during the processing of glass-type materials, the work space in the glove box typically becomes contaminated with broken glass pieces and starting powder materials. Existing HEPA vacuum cleaners fail to provide adequate particle removal and filtration because, in any instances, dry oxygen gas is used as a background gas to avoid reduction of the hot glass. The dry oxygen causes deterioration of the carbon brushes used in presently available commercial vacuum cleaners, thereby generating detrimental dust in the interior glove box environment. Such dust is also generated from the use of dry argon or nitrogen.

Accordingly, a filter system for a glove box is needed for use in the preparation of highly sensitive materials, such as glass materials which are susceptible to contamination from particulates above a few parts per billion.

SUMMARY OF THE INVENTION

The present invention relates to a filter system for use in removing particles from a glove box environment contained in a glove box having an inlet and an outlet. The inventive filter system includes a flexible arm connectable to the glove box outlet for removing gas from the glove box. The arm feeds the removed gas to a first filter stage having a chamber which houses a first removable and changeable filter for filtering particles from the removed gas. A circulation conduit receives the filtered gas from the first filter stage and provides it to a second filter stage connectable to the glove box inlet. The second filter stage fine-filters particles from the gas in the circulation conduit before returning the gas to the glove box environment. A blower is connected to the circulation conduit for causing the gas to flow through the glove box inlet and outlet. One or more valves are provided for isolating the first filter stage from the glove box environment during changing of the first filter to prevent particles in the first filter and in the chamber housing the first filter from entering the glove box environment.

In a preferred embodiment, a vacuum conduit is connected to the first filter stage chamber for removing particles from the chamber during replacement of the first filter in the first filter stage.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The FIGURE depicts a schematic diagram of a filter system connected to a glove box in accordance with a preferred embodiment of the present invention.

DETAILED DESCRIPTION OF THE PRESENTLY PREFERRED EMBODIMENTS

An inventive glove box filter system 10 for use with a conventional or otherwise provided glove box 12 is depicted in the FIGURE. The conventional glove box 12 is known to those having ordinary skill in the art and includes a pair of glove holes 14 and 16 for providing manipulative access to an internal glove box environment. The glove box 12 has an outlet or port 18 through which gases such as oxygen gas and nitrogen used to establish an internal glove box environment suitable for accommodating production and formation of glass materials and other substances are expelled for filtration of contaminant particles, as discussed more fully below. A glove box inlet 20 is also provided for the return or re-circulation of the filtered gas to the glove box environment.

The filter system 10 has an output conduit or arm 22 adaptable for connecting to the glove box outlet 18. Output conduit 22 is preferably adjustable for accommodating attachment or connection to various types of glove boxes and to glove boxes positioned at different heights on, for example, freestanding supports, laboratory tables, etc. The output conduit 22 provides an output passage for gas carrying contaminants removed from the glove box environment and provides the removed gas to a first filter stage 30 for removal of most or all of the contaminants. The first filter stage 30 has a housing 32 which is preferably cylindrically shaped to define a chamber 36 therein. A first filter 38 is contained in the chamber 36 through which the removed gas is directed. The first filter 38 is preferably a corrugated, cylindrically shaped filter having a particle rating of 10 microns.

The first filter 38 contained in chamber 36 is replaceable, as for example when the filter becomes clogged with particles filtered from the removed gas over a period of time. The preferred or appropriate time for changing of the filter may be detected by, for example, measuring the vacuum pressure in output arm 22. Replacement of the first filter 38 is accomplished by accessing chamber 36 through a cover 34.

Gas filtered by the first filter stage 30 is output to a circulation conduit 50 connected, as shown, between the first filter stage and the glove box inlet 20. A blower 54 is connected to the circulation conduit 50 for providing adequate suction for moving gas through the inlet 20, outlet 18 and circulation conduit 50 in the clockwise direction shown by way of example in the FIGURE. Blower 54 is preferably a brushless hermetic blower which produces fewer dust particles than those produced by carbon brush-type blowers. Prior to re-entry of the filtered gas into the glove box environment, the gas is passed through a second filter stage 58 containing a second filter 59 therein which is positioned at the glove box inlet 20.

During operation, dust particles formed in the glove box chamber, for example as a result of the manufacture of glass materials, are carried in gas removed from the glove box environment through arm 22 and into the first filter stage for filtering by first filter 38. The gas is then provided to the second filter stage 58 which fine-filters remaining particles as well as additional particles that may be created by blower 54. The gas is then returned through glove box inlet 20.

A problem that arises in the system 10 is that dust particles captured by either or both of the first filter stage 30 and second filter stage 58 may contaminate the glove box environment when the first or second filters are changed. For example, when the first filter 38 is removed from chamber 36, particles that remain in the chamber will travel to the glove box environment. To prevent such an occurrence, the inventive system 10 includes an outlet valve 24 and a first filter change valve 44. Both valves are moveable from an open position—which allows gas to flow in the intended manner through first filter 38—and a closed position for facilitating filter replacement. To replace the first filter, valves 24 and 44 are first closed, thus preventing particles from entering the glove box environment, and the first filter chamber 36 can then be accessed through cover 34.

Once first filter 38 has been changed, the air contained in chamber 36 should be purged prior to restarting the system. For this purpose, a vacuum conduit 48 is provided in communication with chamber 36 through a vacuum valve 46. During normal operation valve 46 will remain closed but is opened during the changing of the first filter. A vacuum source (not shown) is connected to an end of vacuum conduit 48 for expunging air contained in chamber 36. Thereafter, valve 46 is again closed to allow for normal system operation.

The first filter stage is preferably contained in a housing or enclosure 60, preferably connected to the glove box and having an access panel or door 62 to provide access to the first filter stage 30 and valves 24, 44 and 46. Enclosure 60 is typically ventilated by a ventilation hood (not shown), as is known in the art, which is connected through a ventilation conduit 64. As for the second filter stage 58, this stage, like the first filter stage, is isolatable by a valve 56 which closes off conduit 50 to allow for changing of the second filter 59.

While there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A glove box filter system for circulating gas through an environment contained in a glove box having an outlet and an inlet so as to remove contaminants from the glove box environment and prevent contaminants from entering the glove box environment, comprising:

an outlet conduit adapted for connection to the glove box outlet for providing a path for removal of gas from the glove box environment;

a first filter stage in communication with said outlet conduit for receiving the removed gas and for filtering out contaminants contained in the removed gas, said first filter stage having an access chamber for housing a removable filter;

a circulation conduit in communication with said first filter stage and with the glove box inlet for receiving the filtered gas from said first filter stage;

a blower connected to said circulation conduit for moving gas in said circulation conduit through the inlet and outlet of the glove box;

a second filter stage in communication with said circulation conduit for fine-filtering the filtered gas prior to re-entry of the filtered gas to the glove box environment through the glove box inlet; and an isolation valve connected to said circulation conduit and movable between an open position for allowing gas to flow through said circulation conduit, and a closed position for preventing gas flow through said circulation conduit, said closed position preventing contaminants present in said first filter stage housing from entering the glove box environment during removal of the removable filter contained in said first filter stage housing.

2. The system of claim 1, wherein said isolation valve is disposed between said first filter stage and said blower.

3. The system of claim 1, wherein said isolation valve comprises a first isolation valve and a second isolation valve, said first isolation valve being disposed between said first filter stage and said blower, and said second isolation valve being disposed between said outlet conduit and said first filter stage.

4. The system of claim 3, further comprising an inlet valve disposed between said blower and said second filter stage, said inlet valve being moveable between an open position for allowing gas to flow through said circulation conduit, and a closed position for allowing a filter in said second filter stage to be changed while preventing contaminants from entering the glove box environment.

5. The system of claim 1, wherein said blower comprises a brushless hermetic blower.

6. The system of claim 1, further comprising an output conduit and an output valve connected to said first filter stage, said output valve being moveable between a closed position for preventing gas flow through said output conduit, and an open position for allowing gas flow from said first filter stage through said output conduit during replacement of a filter in said first filter stage.

7. The system of claim 6, further comprising a housing defining a chamber for containing said first filter stage, said housing having an access door for providing access to said first filter stage, and a ventilation duct for removing gas present in said housing chamber.

* * * * *